F. LAIST.
LEACHING SOLUTION HEATING SYSTEM.
APPLICATION FILED JUNE 1, 1914.
1,115,689.
Patented Nov. 3, 1914.
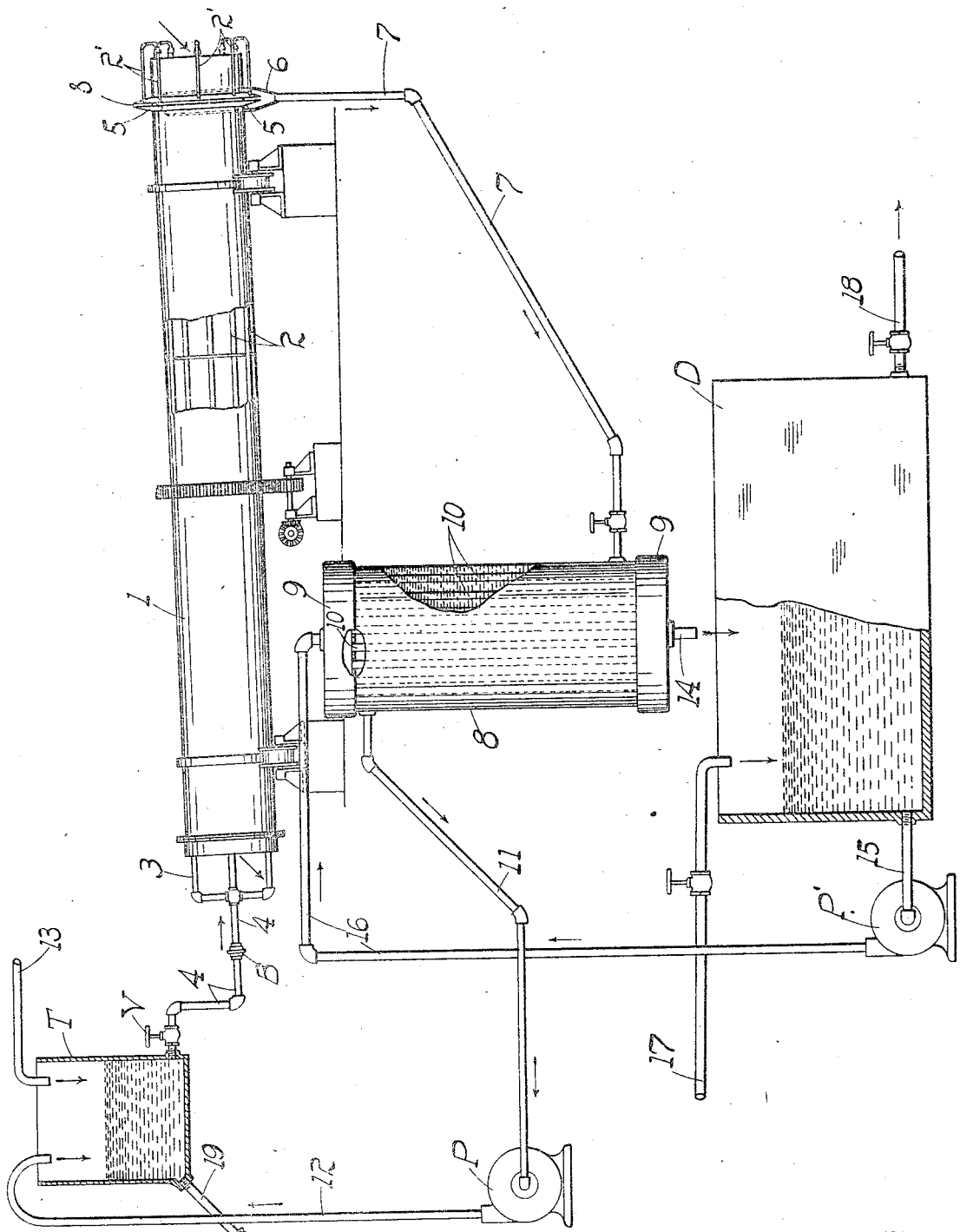
WITNESSES:
Harry A. Beimel
N. L. Rohacek
INVENTOR.
Frederick Laist.
BY Emil Starek
ATTORNEY.

UNITED STATES PATENT OFFICE.

FREDERICK LAIST, OF ANACONDA, MONTANA.

LEACHING-SOLUTION-HEATING SYSTEM.

1,115,689.	Specification of Letters Patent.	Patented Nov. 3, 1914.

Application filed June 1, 1914. Serial No. 842,224.

*To all whom it may concern:*

Be it known that I, FREDERICK LAIST, a citizen of the United States, residing at Anaconda, in the county of Deerlodge and State of Montana, have invented certain new and useful Improvements in Leaching-Solution-Heating Systems, of which the following is a full, clear, and exact description, reference being had to the accompanying drawings, forming a part hereof.

My invention has relation to improvements in leaching solution heating systems; and it consists in the novel features and arrangement of parts more fully set forth in the specification and pointed out in the claims.

In the drawings, the figure represents an elevation of my system, the illustration being more or less diagrammatic in character.

The present invention is directed to a system of heating leaching solutions by the heat absorbed by the water circulating through ore coolers traversed by charges of hot roasted ore on which the leaching solution is intended to operate.

A further object is to maintain the temperature of the circulating water as well as that of the leaching solution at points where they will be most effective, regard being had of course, for the temperature of the ore charge traversing the cooler. An example of such a cooler will be found in my U. S. Patent Number 1,090,549, dated March 17, 1914, the cooled calcines discharged therefrom being leached with dilute sulfuric acid with or without an admixture of common salt, and then subsequently precipitated by sulfureted hydrogen, the reaction effecting a regeneration of the leaching solution or solvent which is then used on fresh charges of calcine. In the present embodiment of my invention I avail myself of an ore cooler on the order of that covered by my patent aforesaid, although it is to be understood that I am not to be restricted to any particular form or construction of any apparatus entering as an element into the present system.

The advantages of the invention will be best apparent from a detailed description thereof, which is as follows:

Referring to the drawing, 1, represents an open ended tube or drum rotatable about its axis, on the inside of which are disposed adjacent the walls thereof the circulating water tubes 2, the latter receiving their water supply from a cluster of water-distributing pipes 3, radiating from a common supply-pipe 4 in the path of which is interposed a combined stuffing box and swivel joint B, the pipe being equipped with an ordinary cut-off hand valve V at a point adjacent the water tank T. The drum 1 is slightly inclined to the horizontal, the hot calcines being charged into the raised end of the drum and the cooled calcines being discharged from the opposite end, the same as in the patented cooler aforesaid. To the discharge and of the circulating pipes 2 are coupled the extension pipes 2' which are directed rearwardly or toward the ore-discharge end of the drum (a precaution resorted to to avoid the hot calcines from coming in contact with the hot water discharged from the pipes 2), and which discharge into an annular peripherally slotted casing 5 secured to the drum, the water flowing from said casing through the peripheral slot *s* thereof into a stationary trough 6 surrounding the major portion of the periphery of the drum and enveloping the casing 5, the trough in turn discharging the hot water through a valve-controlled pipe 7 into the bottom of a solution heater 8. The heater 8 is composed of terminal heads 9, 9, connected by circulating tubes 10, the spaces around the tubes being filled with the water discharged from the pipe 7, the water after circulating through the heater escaping by the pipe 11 leading from the upper portion of the heater at a point below the upper head 9. The water from the pipe 11 is pumped by means of a pump P through the pipe 12 into the tank T, into which likewise discharges fresh water through a pipe 13 from any suitable source (not shown). The heated leaching solution discharges through the spout or nozzle 14 leading from the bottom of the lower head 9 into a solution tank D, from which the solution may be circulated through the heater by a pump P' to which the solution is delivered through a pipe 15, and from which it is discharged and circulated by the pipe 16 tapping the upper head 9 of the heater. Where the leaching solution is regenerated as above described, such regenerated portion may be conducted from its proper sources of supply (not shown) through a valve-controlled pipe 17, the contents of the solution tank being abstracted through a valve-controlled pipe 18 as shown.

Any discard from the tank T may be removed through a valve-controlled pipe 19.

The operation of the system is substantially as follows: As stated above, the ore-cooler 1 is on the order of that covered by my patent aforesaid, the hot calcines from the roasting furnaces being charged thereinto at the upper end and discharged in a comparatively cool state at the lower end, the cooling medium (water) circulating upward through the tubes 2. The water flows from the water tank T through the pipe 4, distributing branches 3 and circulating tubes 2, discharging (during the rotation of the drum 1) through the pipes 2' into the casing 5, whence it drops into the trough 6 and from that the hot water flows through the pipe 7 into the heater 8, traversing the latter around the circulating tubes or pipes 10 and escaping through the pipe 11 into the pump P by which it is forced into the tank T through the pipe 12, the water thus discharged into the tank receiving accessions of fresh water from the pipe 13. While the hot water is circulating upward through the solution heater 8, the leaching solution flows downward through the tubes 10 connecting the heads 9, 9, being delivered to the upper head through the pipe 16 by the pump P' which draws the leaching solution from the solution tank D, the solution being discharged from the heater, through the spout 14 leading from the lower head 9, back into the tank D. In this way the solution is, or may be, circulated as often as desired through the heater 8, such repeated circulation being desirable and in fact necessary where accessions of cold regenerated solution are made to the contents of the tank D from the pipe 17.

In the operation of my system, the temperature of the cooling water or that stored in the tank T and which is used for circulating through the ore-cooler 1, is brought down to approximately 100 degrees Fahrenheit being maintained at approximately said temperature or slightly lower by accessions of fresh water entering through the pipe 13, the fresh water being at substantially 60 degrees Fahrenheit. The hot calcines are fed to the treatment drum or cylinder 1 at substantially 800 degrees Fahrenheit and in their traverse through the drum they are cooled down to about 200 degrees Fahrenheit escaping from the drum at substantially said latter temperature, while the cooling water circulating through the pipes 2 discharges at the ore-intake end of the drum at a temperature in the neighborhood of 190 degrees Fahrenheit, or slightly below the boiling point. The water after it leaves the heater 8 drops to about 100 degrees temperature so that the heat units it absorbs from the hot calcines in the ore-cooler are practically imparted to the leaching solution while traversing the heater 8. By controlling the rate of flow of the liquids (by a proper manipulation of the pumps and various valves) and the rate of feed and discharge of the ore or hot calcires, the temperature of the water entering the pipes 2 may be kept practically constant, being caused to surrender to the leaching solution in the heater 8 all the heat units is absorbed while circulating through the ore-cooler 1. In this way the heat of the calcines may be utilized to good advantage. The temperature of the solution in the leaching tank D may be regulated by the rate of influx of regenerated solution, the rate of abstraction of liquid from the tank, and the size of the tank as quite obvious from the drawings. The cooled calcines are conducted to a suitable leaching tank into which the hot leaching solution from the tank D is conducted through the pipe 18 and the metallic oxids of the calcines are dissolved. The solution is then drained into a precipitating tank and the copper (and silver) precipitated by any of the methods known to the art, the acid solvent or leaching solution being regenerated.

Having described my invention, what I claim is:—

1. In combination with a treatment vessel traversed by a charge of hot material in one direction, means for conducting a circulating cooling medium through the vessel in the opposite direction, a discharge for the heated cooling medium, a source of supply for the cooling medium, a heater located outside the treatment vessel, means for circulating the heated cooling medium through the heater in one direction, means for circulating through the heater a quantity of leaching solution in a direction opposite to the flow of the heated cooling medium therethrough, and means coupled to the heater for returning the cooled heating medium after traversing the heater, to its original source of supply.

2. In combination with a treatment vessel traversed by a charge of hot calcines in a given direction, means for causing a circulation of a cooling medium through the vessel in the opposite direction, means for discharging the cooled calcines and hot cooling medium at respectively opposite ends of the vessel, a heater outside the treatment vessel traversed in one direction by a liquid adapted to dissolve the metallic oxids of the calcines, means for circulating the hot cooling medium through the heater in the opposite direction and returning the medium in cool condition to the treatment vessel aforesaid, and means for regulating the rate of movement of the charge and relative flow of the liquids to maintain any desired temperature therefor.

3. In combination with an ore cooler traversed by hot calcines in one direction, means for circulating water therethrough in the opposite direction, the cool calcines and heated water discharging respectively at opposite ends of the cooler, a water tank supplying cool water to the circulating means in the cooler, a heater outside the ore cooler, means for circulating the heated water discharged from the cooler, through the heater in one direction, a solution tank, means for circulating the solution from the tank through the heater in the opposite direction and returning the same to the solution tank, means for returning the cooled water after traversing the heater, to the water tank, and means for controlling the rate of flow of the liquids to maintain the same at any desired temperatures.

4. In combination with an ore cooler traversed simultaneously in opposite directions by hot calcines and cooling water, a heater traversed by a liquid operating as a solvent for the metallic oxids of the calcines, a tank for the solvent and means for circulating the hot water discharged from the cooler through the heater for heating the solvent liquid and cooling the water.

5. In combination with an ore cooler traversed simultaneously in opposite directions by hot calcines and cooling water, a heater traversed by a liquid operating as a solvent for the metallic oxids of the calcines, a tank for the solvent and means for circulating the hot water discharged from the cooler through the heater concurrently with the traverse of the solvent therethrough, whereby the latter becomes heated and the hot water is correspondingly cooled, and means for returning the cooled water to the ore cooler.

In testimony whereof I affix my signature, in presence of two witnesses.

FREDERICK LAIST.

Witnesses:
W. H. SHEERIN,
H. G. WRIGHT.